(12) United States Patent
Krafft

(10) Patent No.: US 8,776,976 B2
(45) Date of Patent: Jul. 15, 2014

(54) ELECTROMAGNETIC FRICTION CLUTCH

(75) Inventor: Rainer Krafft, Heiligenberg (DE)

(73) Assignee: Licos Trucktec GmbH, Markdorf (DE)

( * ) Notice: Subject to any disclaimer, the term of this patent is extended or adjusted under 35 U.S.C. 154(b) by 336 days.

(21) Appl. No.: 12/835,113

(22) Filed: Jul. 13, 2010

(65) Prior Publication Data

US 2011/0005883 A1 Jan. 13, 2011

(30) Foreign Application Priority Data

Jul. 13, 2009 (DE) .......................... 10 2009 033 178

(51) Int. Cl.
*F16D 27/01* (2006.01)
*F16D 27/112* (2006.01)

(52) U.S. Cl.
USPC .................. 192/48.2; 192/84.31; 310/105

(58) Field of Classification Search
USPC ...................................... 192/84.31
See application file for complete search history.

(56) References Cited

U.S. PATENT DOCUMENTS

| | | | |
|---|---|---|---|
| 2,407,757 A * | 9/1946 | MacCallum | 192/84.94 |
| 6,446,772 B1 * | 9/2002 | Inose et al. | 192/35 |
| 7,367,439 B2 * | 5/2008 | Ohtsuka et al. | 192/84.941 |
| 7,422,094 B2 * | 9/2008 | Yokomori | 192/84.7 |
| 2003/0192763 A1 | 10/2003 | Inoue et al. | |
| 2005/0052090 A1 * | 3/2005 | Morimatsu | 310/90 |
| 2006/0131120 A1 * | 6/2006 | Boffelli | 192/48.2 |
| 2010/0259121 A1 | 10/2010 | Ueda et al. | |

FOREIGN PATENT DOCUMENTS

| | | |
|---|---|---|
| EP | 1 353 051 A2 | 10/2003 |
| FR | 2 559 222 | 8/1985 |
| GB | 2 155 565 A1 | 9/1985 |
| JP | 2009-121676 A1 | 6/2009 |

* cited by examiner

*Primary Examiner* — David D Le
*Assistant Examiner* — Mark Manley
(74) *Attorney, Agent, or Firm* — Burr & Brown, PLLC

(57) ABSTRACT

An electromagnetic friction clutch including a rotor, further clutch element which orbits a common axis of rotation with the rotor and is supported so that it can rotate relative to the rotor, eddy current elements for transmitting a rotational movement on the principle of an eddy current clutch, one of the eddy current elements being rotationally fixed to the further clutch element, and one or more magnetic elements rotationally fixed to the rotor so as to orbit one of the eddy current elements.

16 Claims, 4 Drawing Sheets

ELECTROMAGNETIC FRICTION CLUTCH

CROSS-REFERENCE TO RELATED APPLICATIONS

This application claims the benefit under 35 USC §119(a)-(d) of German Application No. 10 2009 033 178.6 filed Jul. 13, 2009, the entirety of which is incorporated herein by reference.

BACKGROUND OF THE INVENTION

1. Field of the Invention

The invention relates to an electromagnetic friction clutch.

2. Description of Related Art

Electromagnetic friction clutches are used in the field of vehicle construction for controllably driving auxiliary units such as fans and coolant pumps, which draw mechanical power from the engine. Widely varying designs are known here, including ones in which an electromagnetic friction clutch is combined with an eddy current drive. An eddy current drive is supplemented, for example, when the shut-down of an auxiliary unit is undesirable or when in energy-saving operation a low-speed rotational movement is to be transmitted. Known friction clutches equipped with an eddy current drive comprise numerous additional components, however, and owing to their sophisticated design often require a significantly greater manufacturing outlay.

SUMMARY OF THE INVENTION

The object of the invention is to provide an electromagnetic friction clutch with eddy current drive, which will allow comparatively easier and more cost-effective manufacture and which has a compact construction.

The invention proceeds from an electromagnetic friction clutch comprising a rotor, a further clutch element, which orbits a common axis of rotation with the rotor and is supported so that it can rotate relative to the rotor, and elements for transmitting a rotational movement on the principle of an eddy current clutch. The essence of the invention resides in the fact that one or more magnetic elements, which orbit an eddy current element rotationally fixed to the further clutch element, are rotationally fixed to the rotor. In particular, the magnetic elements are fitted in such a way that in the disengaged state they orbit the eddy current element over a band-shaped axial section of the clutch axis of rotation. The eddy current preferably extends further inside, in particular with at least the same band width.

The magnetic elements are preferably fitted in such a way that magnetic fields of different strength and orientation in the corresponding radial directions result along a circular circumference on the outside of the eddy current element. For example, one pole face of each magnetic element is directed towards the eddy current element. A gap should remain between the pole faces of the magnetic elements and the outer circumferential surface of the eddy current element, in order to avoid any contacts. All sides of the magnetic elements not directed towards the eddy current element, in particular the radially outward facing side, are therefore available for fixing. This affords the advantage that connections of the magnetic elements to the rotor, particularly on their radially outward facing side, can be of self-securing design. A further advantage ensues from the fact that due to the length of the magnetic elements and of the eddy current element along the clutch axis of rotation, the torque that can be transmitted by the eddy current drive can be adjusted to a predefined value.

A further advantage here is that a corresponding adjustment can be made irrespective of the size of the available friction surface or the diameter of the further clutch element.

In a further advantageous clutch according to the invention the rotor fulfils various functions, for example in concentrating and conducting the magnetic flux for the attraction of an armature disk, or in making a connection to a drive element, as it constitutes a central and relatively large component of the clutch. For this reason the rotationally rigid connection of the magnetic elements to the rotor affords the advantage that such connections to the rotor require a comparatively small additional design and manufacturing outlay.

Owing to the heavy metallic elements such as iron, cobalt or nickel contained therein, ferromagnetic and in particular hard magnetic materials, such as those contained in the magnetic elements, have a high density. Under the rotational movement of the magnetic elements, and particularly in the event of a variation in the rotational speed, comparatively large inertial forces therefore occur. In particular, if the clutch according to the invention is operated in such a way that the rotor forms the drive side of the clutch, these inertial forces are overcome directly by the clutch drive. The output side is thereby advantageously relieved of said inertial forces and upon engagement is capable of reaching the speed of the drive side more rapidly. Other advantages accruing are that the process of engagement consumes less mechanical energy and generates less wear, particularly on the friction surfaces.

The invention is preferably embodied so that the magnetic elements of the eddy current clutch are fitted to one or more axial extensions of the rotor. In this case one axial extension may serve, for example, for connecting all magnetic elements to the rotor, or each magnetic element or in particular a pair of adjacent magnetic elements, for example, may each be connected to the rotor by its own axial extension. One or more axial extensions may be detachably fitted, for example by bolting on, or permanently fitted, for example by welding on, or may be formed from a blank by deformation and/or abrasive machining, for example, milling. This affords the advantage that the formation of axial extensions can be optimally matched to the manufacture of the rotor.

It is especially preferred if the axial extension of the rotor is of tubular design concentric with the clutch axis of rotation. This affords the advantage that the magnetic elements can be fixed, in particular, to the inside of the tubular wall, for example by adhesive bonding or clamping. The magnetic elements are thereby annularly enclosed by the tubular wall, advantageously enabling the tubular wall to absorb, largely by itself, all inertial forces generated in the course of the movement of the magnetic elements. A tubular extension represents a relatively simple design, which is advantageously adapted to the shape of the rotor and which can be fitted to the rotor with advantageously little outlay, for example, by friction welding, machine turning or forming on.

In a further embodiment of the invention, the magnetic elements of the eddy current clutch are fitted to a drive element, which is fixed to the rotor concentrically with the clutch axis of rotation. Such a drive element may be a wheel rim for a belt drive, for example. Possibilities for fixing at a greater distance from the clutch axis of rotation present themselves, in particular, when the drive element is fitted to the rotor in such a way that it concentrically encloses the rotor. This affords the advantage of facilitating assembly of the clutch, because the magnetic elements can be fitted to the rotor together with the drive element.

In an especially preferred embodiment of the invention, the rotor, an axial extension of the rotor, to which the magnetic elements are fitted, and a drive element form one integral component. Multiple components and their functions are therefore advantageously combined in one single component, which can be manufactured more quickly and easily in one piece. It is particularly advantageous here that the magnetic characteristics of the rotor material also support the action of the magnetic flux generated by the magnetic elements in the eddy current drive.

In another embodiment of the invention, the eddy current element is integrally formed. For example, a magnetic yoke ring for increasing the induced eddy currents in the eddy current element is omitted. This is advantageous particularly when the eddy current drive largely serves to prevent a shutdown of the auxiliary unit driven by the clutch by transmitting a relatively low torque. Similarly, cooling elements may advantageously be formed on the eddy current element, thereby avoiding the separate attachment of cooling elements.

In another embodiment of the invention, the eddy current element is a separate component for fitting to a common rotary shaft, rotationally fixed to the further clutch element. Here the eddy current element is fixed at an axial position of the clutch axis of rotation which is independent of the axial position of the further clutch element. This affords the advantage, particularly if the further clutch element, for example, an armature disk, is axially moveable, that the eddy current element can always retain its axial position relative to the magnetic elements. Furthermore the axial mobility of the further clutch element is advantageously not reduced by the inertial forces of the eddy current element.

In a further embodiment of the invention, the eddy current element is fixed to the further clutch element. Attaching it to the further clutch element, for example a friction disk, means that the eddy current element is rotationally fixed thereto and according to the invention is supported so that it can rotate in relation to the rotor. Because this obviates the need for an additional section on a rotary shaft on which to fit the eddy current element, the rotary shaft and hence the extent of the clutch in the direction of the clutch axis of rotation can be of correspondingly shorter design.

The further clutch element is preferably a friction surface element. The friction surface element is rotationally fixed to the rotor by way of its friction surfaces only in the engaged state. Fitting the eddy current element to the friction element advantageously saves the need for additional fasteners for the eddy current element.

It is especially preferred if the further clutch element is an armature disk component having an armature disk, which interacts magnetically with the rotor and in so doing in the engaged state enters into frictional contact with the rotor via a friction surface element. This affords the advantage of an especially compact construction, because the armature disk and the eddy current element are supported by means of common components so that they can rotate relative to the rotor and to the clutch axis of rotation, for example, on a rotary shaft.

In a further embodiment of the invention, an armature disk component comprises an armature disk, a flange and a spring element, the flange and the spring element being integrally formed. This advantageously serves to reduce the number of individual components from which the clutch is assembled and the corresponding number of manufacturing stages.

It is also advantageous for an armature disk component to comprise an armature disk, a spring element and a flange, the armature disk, the spring element and the flange being integrally formed. This eliminates a further separate component.

In an especially preferred embodiment of the invention the further clutch element and the eddy current element are formed as one integral component. As the further clutch element, a friction disk or an armature disk component, for example, may be combined with the eddy current element to form one integral component. This measure also affords the advantage that it reduces the number of single components in a clutch.

In a further preferred embodiment of the invention, a ring composed of magnetically conductive material is fitted concentrically to the eddy current element so that the ring in a radial direction is at least partially enclosed by the eddy current element. The magnetically conductive ring serves to conduct the magnetic flux emitted by magnetic elements, so that eddy currents are generated more efficiently. This enables the eddy current drive to transmit larger torques and higher rotational speeds.

BRIEF DESCRIPTION OF THE DRAWINGS

Further advantages and details of the invention will be described with reference to four exemplary embodiments, which are represented in the drawings. Here the same reference numerals will be used uniformly for parts of equivalent function in all figures.

DETAILED DESCRIPTION OF THE INVENTION

Figure 1:
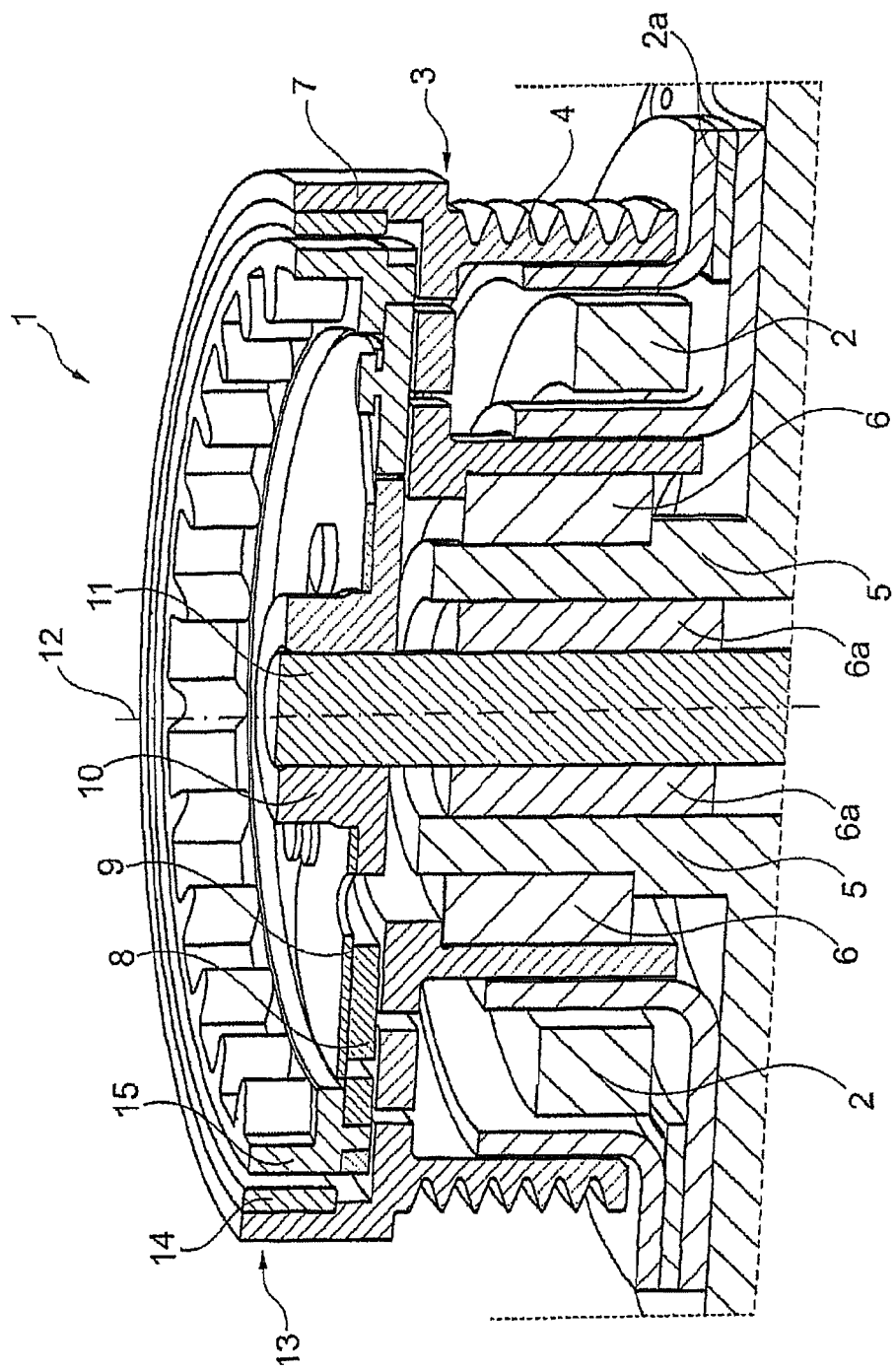
FIG. 1 shows a perspective view of a schematic sectional representation of a friction clutch according to the invention.

FIG. 1 shows an electromagnetic friction clutch 1, which may serve, for example, for controllably driving a coolant pump (not shown) of an internal combustion engine. The internal construction of the clutch is represented schematically by a section along a clutch axis of rotation 12. A bearing connection 5 of a pump housing, for example, and an electromagnet 2 are fixedly arranged concentrically with the clutch axis of rotation 12. A rotor 3 is connected to the bearing connection 5 by a ball bearing 6 so that it can rotate about the clutch axis of rotation 12. With the drive element 4, a drive wheel having guide grooves for a belt drive, formed on the rotor 3, the rotor 3 is intended as drive side of the clutch 1.

A further ball bearing 6a is arranged inside the bearing connection 5. The inner ball bearing 6a holds a rotary shaft 11 in a rotatable position about the clutch axis of rotation 12. The rotary shaft 11 is part of the output side of the clutch 1.

An armature disk 8 is rotationally fixed to the rotary shaft 11 by way of a spring element 9 and a flange 10. The armature disk 8 is drawn against the rotor 3 by permanent magnets 2a, so that a frictional connection occurs between the armature disk 8 and the rotor 3. As soon as electrical current of sufficient strength flows through the windings of the electromagnet 2, neutralizing a magnetic field of the permanent magnets, the frictional connection between the armature disk 8 and the rotor 3 is cancelled. The clutch is thereby switched to a de-energized state. An eddy current clutch acts in the disengaged, energized state as described below.

Adjoining the drive element 4 in an axial direction is a tubular extension 7 of the rotor 3 of somewhat larger radius. The tubular extension 7 extends so far in an axial direction that it fully encloses both the armature disk 8 and an eddy current element 15. The rotor 3, the drive element 4 and the tubular axial extension 7 form, for example, an integral component composed of magnetically conductive metal.

Magnetic elements 14 are fitted to the inside of this tubular extension 7. This may be a single magnetic element subdivided along its circumference into a plurality of differently magnetized segments. In this case, for example, adjacent segments are each magnetized in opposite directions to one another. It is equally possible to use multiple individual magnets, which are fitted along the circumference on the inside of the tubular extension 7, so that magnetic north and south poles are alternately directed towards the circumferential surface of the eddy current element. In both cases it is sufficient to bond the magnetic ring or the magnets to the inside of the tubular extension 7.

In the disengaged, energized state of the clutch 1, that is to say when the armature disk and the rotor are no longer in frictional contact with one another, the magnetic elements 14 and the eddy current element 15 are able to rotate relative to one another. In so doing the magnetic elements 14 induce eddy currents in the eddy current element 15, so that through electromagnetic interaction between the magnetic elements 14 and the eddy current element 15, a torque is transmitted to the rotary shaft 11. Here the magnetic material characteristics of the rotor, for example, also assist the eddy current clutch 13 in that the tubular extension 7 produces a concentration of the magnetic flux in the magnetically conductive material.

The eddy current element 15 is fitted to the armature disk 8. In this embodiment it is particularly advantageous to manufacture the eddy current element 15 from a lightweight metal having a high electrical conductivity, such as aluminum, for example. The high electrical conductivity promotes the transmission of higher torques and rotational speeds. The lighter the eddy current element 15, the lower the inertial forces occurring on the armature disk 8. This affords the advantage that the armature disk can engage more rapidly, and length of time taken for rotationally fixed frictional contact with the rotor is therefore determined substantially by the mechanical power take-off on the rotary shaft 11. Because the clutch is designed to transmit only a relatively low torque in the absence of frictional contact between the armature disk and the rotor, a magnetic yoke ring on the eddy current element 15 can be dispensed with.

Figure 2:
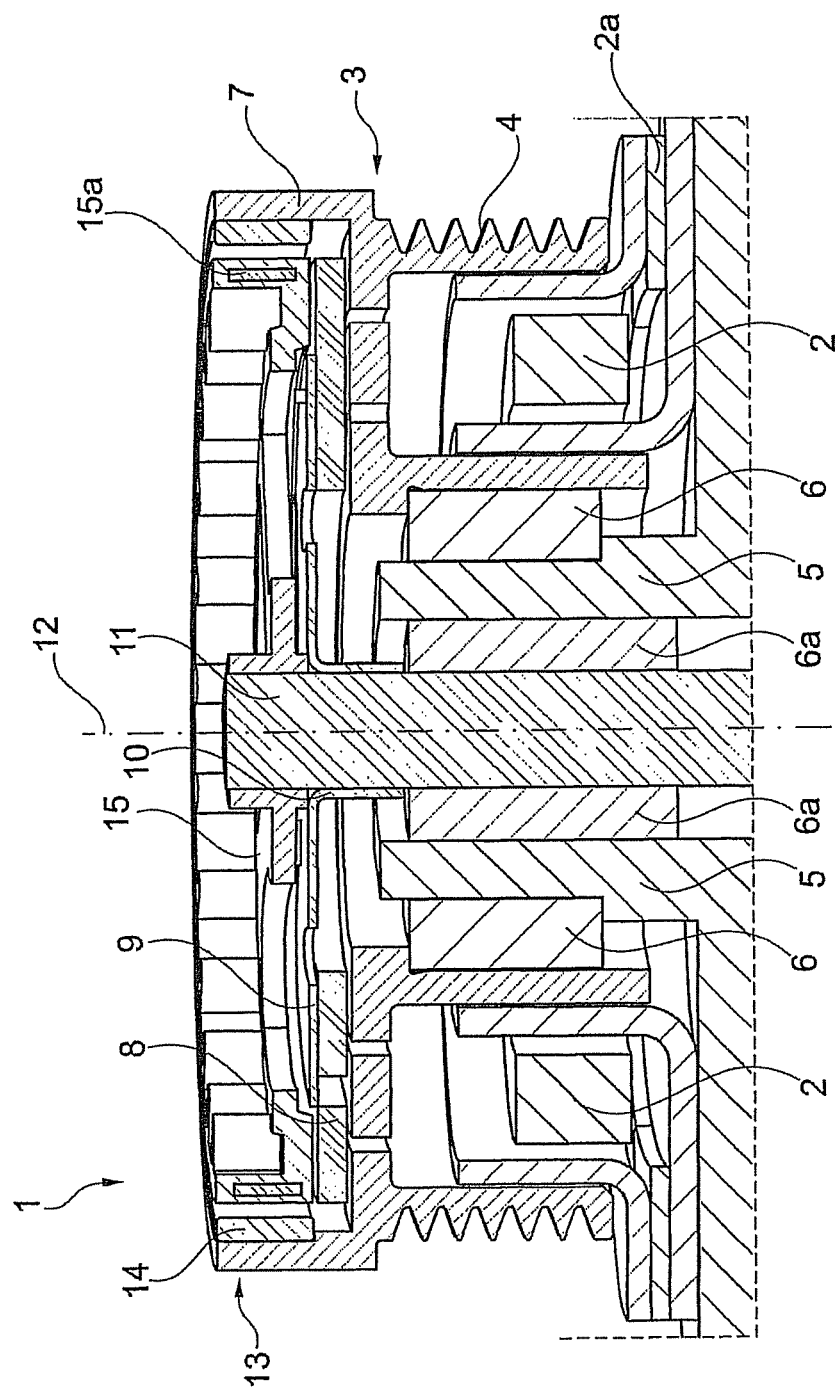
FIG. 2 shows a schematic sectional representation of an electromagnetic friction clutch with separate eddy current element.
Figure 3A:
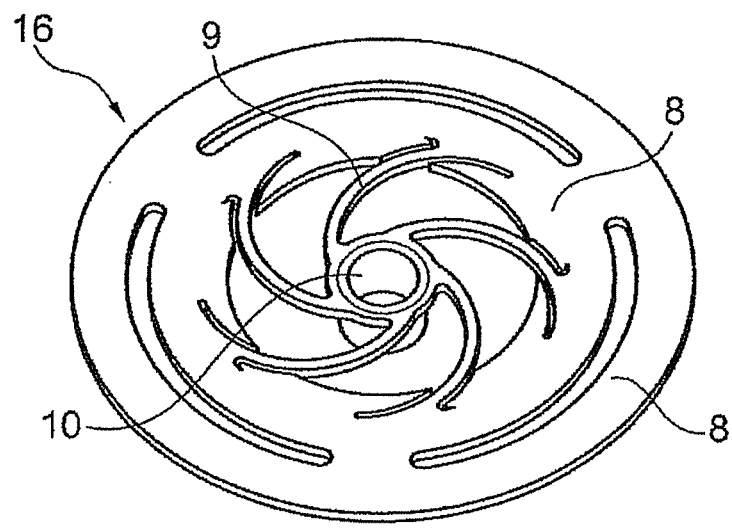
FIG. 3a shows a perspective representation of an integral component combining armature disk, spring element and flange.
Figure 3B:
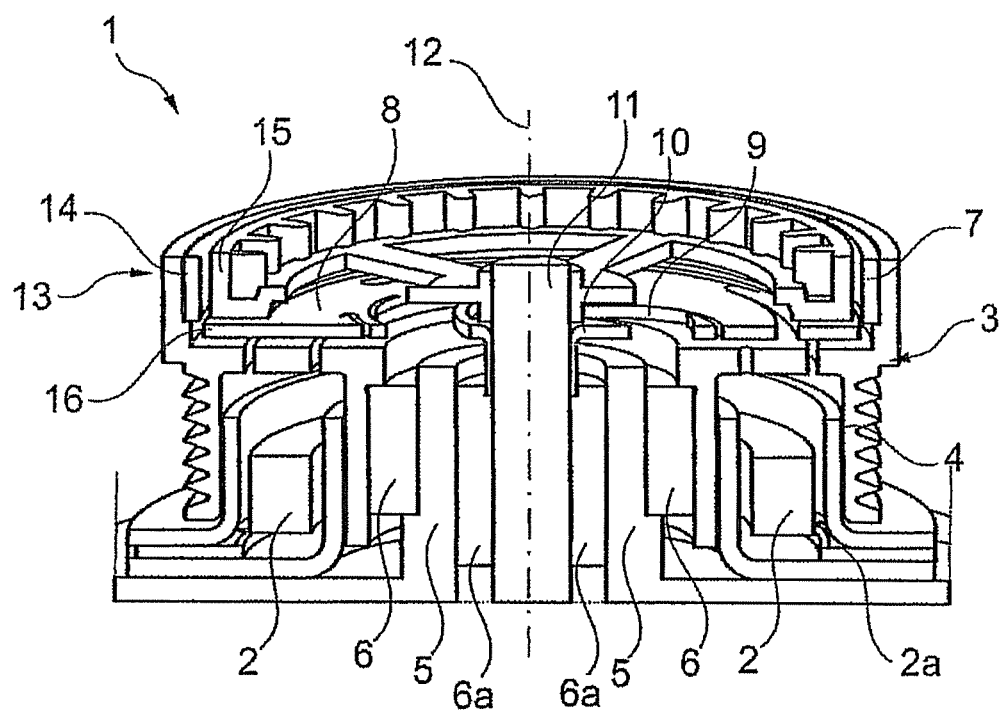
FIG. 3b shows a schematic sectional representation of an electromagnetic friction clutch with integral combination of armature disk, spring element and flange.
Figure 4:
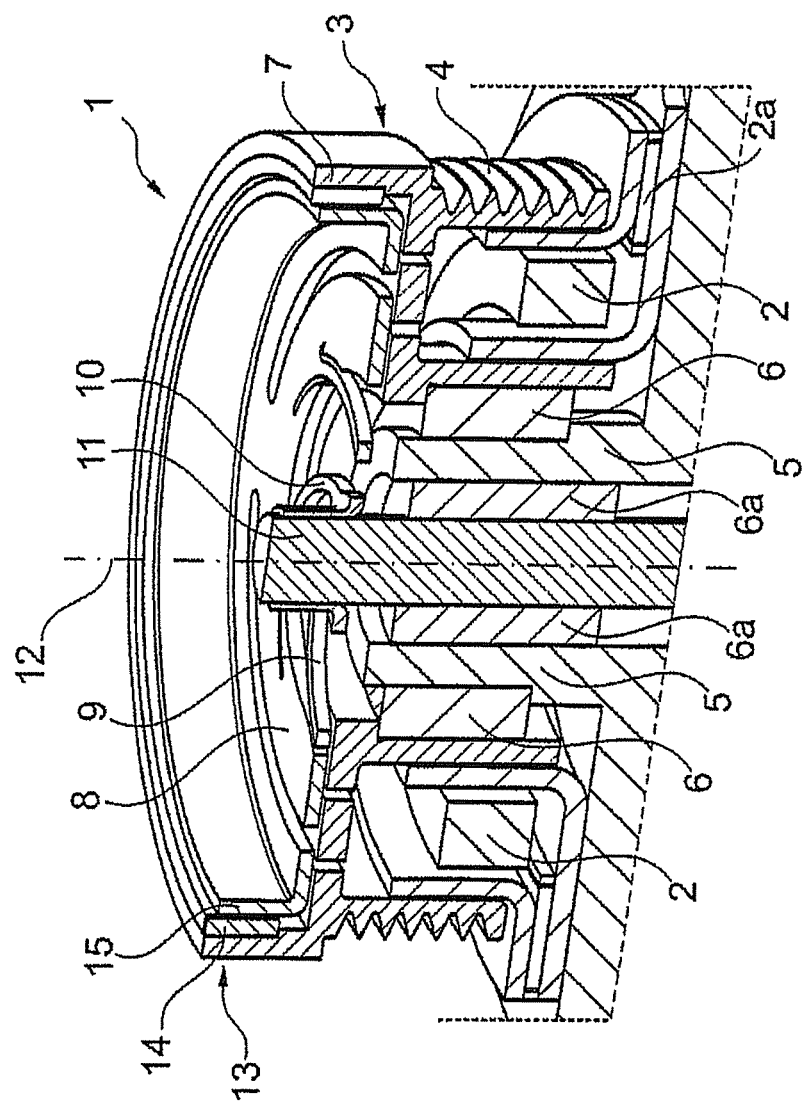
FIG. 4 shows a schematic sectional representation through an electromagnetic friction clutch with integral combination of eddy current element, armature disk, spring element and flange.

Some substantial features of the embodiment of a clutch according to the invention as described above also apply to the exemplary embodiments represented in FIG. 2, FIG. 3b and FIG. 4. In particular, all of the following exemplary embodiments comprise a rotor 3, integrally embodying the tubular axial extension 7 and the drive element 4 and forming the drive side of the clutch. Equally, in all the following exemplary embodiments the rotor 3 and the rotary shaft 7 are correspondingly fitted by ball bearings 6, 6a to the fixed bearing connection 5 so that they can rotate in relation to the latter. For this reason the descriptions of the following exemplary embodiments will primarily explore their differences.

FIG. 2 represents an embodiment of a friction clutch according to the invention in which the eddy current element 15 is connected to the armature disk 8 by the rotary shaft 11. The eddy current element 15 therefore also remains in its axial position when the clutch 1 is in the engaged state, whilst the armature disk 8 can move axially between the positions corresponding to the clutch states. Compared to the embodiment shown in FIG. 1, the rigid connection to the axis of rotation 11 allows the eddy current element only very small variations in position perpendicularly to the clutch axis of rotation. In this embodiment, therefore, the pole surfaces of the magnetic elements 14 may be arranged at a smaller distance from the circumferential surface of the eddy current element, thereby increasing the efficiency of the eddy current drive. FIG. 2 also shows that a ring composed of a magnetically conductive material 15a is, in a radial direction, at least partially enclosed by the eddy current element.

FIG. 2 also shows that a ring 15a composed of magnetically conductive material is, in a radial direction, at least partially enclosed by eddy current element 15.

In the exemplary embodiment shown in FIG. 2 the flange 10 and the spring element 9 form an integral component, which rotationally fixes the armature disk to the rotary shaft 11 whilst allowing it to move axially. The rotary shaft 11 is fixed into the flange 10 by caulking.

FIG. 3a shows an integral armature disk component 16, which combines the functions of the armature disk 8, the spring element 9 and the flange 10. The component is composed of magnetically conductive material, the thickness of which is substantially determined by the functional requirements as an armature disk.

FIG. 3b shows a corresponding clutch arrangement 1, which uses the armature disk component 16 shown in FIG. 3a.

The embodiment of the clutch 1 according to the invention shown in FIG. 4 reduces the number of single components yet further, in that only one integral component, which combines the functions of the eddy current element 15, the armature disk 8, the spring element 9 and the flange 10 in one single component, is fixed to the rotary shaft 11.

LIST OF REFERENCE NUMERALS 1 electromagnetic friction clutch
2 electromagnet
2a permanent magnet
3 rotor
4 drive element
5 bearing connection
6 rolling bearing
6a rolling bearing
7 axial extension
8 armature disk
9 spring element
10 flange
11 output rotary shaft
12 axis of rotation
13 eddy current clutch
14 magnet
15 eddy current element
15a magnetically conductive ring
16 armature disk component

I claim:

1. An electromagnetic friction clutch, comprising a rotor including an axial extension thereof, an electromagnet enclosed within the rotor, a further clutch element, which orbits a common axis of rotation with the rotor and is supported so that it can rotate relative to the rotor, eddy current elements for transmitting a rotational movement on the principle of an eddy current clutch, one of the eddy current elements being rotationally fixed to the further clutch element, and one or more magnetic elements rotationally fixed to the rotor so as to orbit said one of the eddy current elements, wherein the eddy current elements, the one or more magnetic elements and the axial extension of the rotor are arranged in this order and spaced radially from one another in a direction extending radially outward from the axis of rotation of the clutch, wherein the axial extension of the rotor extends away from the electromagnet and encloses the eddy current elements and the one or more magnetic elements, and wherein the rotor concentrates and conducts magnetic flux to attract the further clutch element.

2. The electromagnetic friction clutch according to claim 1, wherein the one or more magnetic elements of the eddy current clutch are fitted to the axial extension of the rotor.

3. The electromagnetic friction clutch according to claim 2, wherein the axial extension of the rotor has a tubular shape that is concentric with the clutch axis of rotation.

4. The electromagnetic friction clutch according to claim 1, wherein the one or more magnetic elements of the eddy current clutch are fitted to a drive element, which is fixed to the rotor concentric with the clutch axis of rotation.

5. The electromagnetic friction clutch according to claim 1, wherein the rotor, the axial extension of the rotor to which the one or more magnetic elements are fitted, and a drive element form one integral component.

6. The electromagnetic friction clutch according to claim 1, wherein said one of the eddy current elements is integrally formed as one piece.

7. The electromagnetic friction clutch according to claim 1, wherein another one of the eddy current elements is a separate component for fitting to a common rotary shaft with the further clutch element.

8. The electromagnetic friction clutch according to claim 1, wherein said one of the eddy current elements is fixed to the further clutch element.

9. The electromagnetic friction clutch according to claim 1, wherein the further clutch element comprises a friction surface element.

10. The electromagnetic friction clutch according to claim 1, wherein the further clutch element comprises an armature disk component having an armature disk that interacts magnetically with the rotor.

11. The electromagnetic friction clutch according to claim 1, further comprising an armature disk component comprising an armature disk, a flange and a spring element, with the flange and the spring element being integrally formed as one piece.

12. An electromagnetic friction clutch, comprising a rotor including one or more axial extensions thereof, an electromagnet enclosed within the rotor, a further clutch element, which orbits a common axis of rotation with the rotor and is supported so that it can rotate relative to the rotor, eddy current elements for transmitting a rotational movement on the principle of an eddy current clutch, one of the eddy current elements being rotationally fixed to the further clutch element, one or more magnetic elements rotationally fixed to the rotor so as to orbit said one of the eddy current elements, and further an armature disk component comprising an armature disk, a flange and a spring element, with the armature disk, the flange and the spring element being integrally formed as one piece, wherein the eddy current elements, the one or more magnetic elements and the one or more axial extensions of the rotor are arranged in this order and spaced radially from one another in a direction extending radially outward from the axis of rotation, wherein the one or more axial extensions of the rotor extend away from the electromagnet and enclose the eddy current elements and the one or more magnetic elements, and wherein the rotor concentrates and conducts magnetic flux to attract the further clutch element.

13. The electromagnetic friction clutch according to claim 1, wherein the further clutch element and the eddy current element are formed as one integral component.

14. The electromagnetic friction clutch according to claim 1, further comprising a ring composed of magnetically conductive material that is fixed concentrically to said one of the eddy current elements in such a way that the ring in a radial direction is at least partially enclosed by said one of the eddy current elements.

15. The electromagnetic friction clutch according to claim 1, wherein the one or more magnetic elements are attached directly to one or more axial extensions of the rotor.

16. The electromagnetic clutch of claim 1, wherein the eddy current elements, the one or more magnetic elements and the one or more axial extensions of the rotor are arranged in this order in a line extending radially away from the clutch axis of rotation such that each extends axially away from the rotor.

* * * * *